C. R. RANEY.
HARVESTER ATTACHMENT.
APPLICATION FILED DEC. 30, 1912.

1,226,370.

Patented May 15, 1917.
2 SHEETS—SHEET 1.

Witnesses
C. C. Palmer

Inventor.
Clemma R. Raney,
By Chas. E. Lord
Atty.

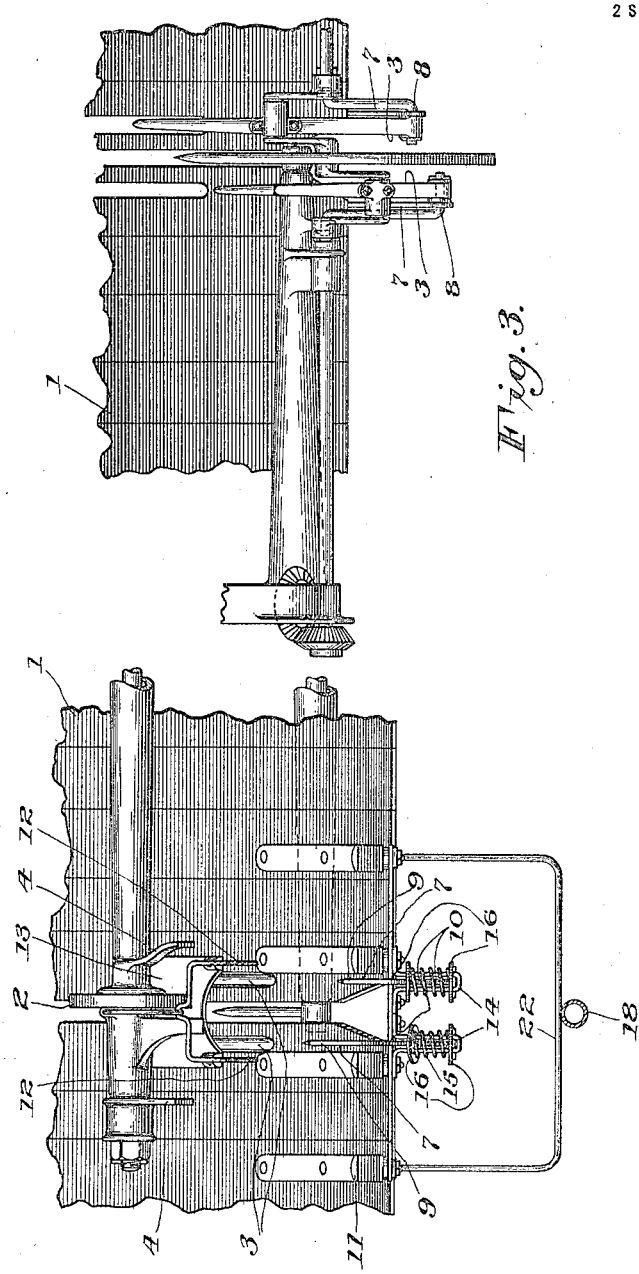

UNITED STATES PATENT OFFICE.

CLEMMA R. RANEY, OF CHICAGO, ILLINOIS, ASSIGNOR TO INTERNATIONAL HARVESTER COMPANY OF NEW JERSEY, A CORPORATION OF NEW JERSEY.

HARVESTER ATTACHMENT.

1,226,370.

Specification of Letters Patent.

Patented May 15, 1917.

Application filed December 30, 1912. Serial No. 739,259.

*To all whom it may concern:*

Be it known that I, CLEMMA R. RANEY, a citizen of the United States, residing at Chicago, in the county of Cook and State of Illinois, have invented certain new and useful Improvements in Harvester Attachments, of which the following is a full, clear, and exact specification.

My invention relates to harvester attachments.

It has for its object to eject the bound sheaves from the binder deck of a harvester in an improved manner. A further object of my invention is to produce a sheaf discharging mechanism especially adapted to coöperate with a shocker and discharge the sheaves at the desired place and in the desired manner upon the sheaf delivery member thereof. I attain these objects by providing improved means coöperating with the sheaf forming and discharging mechanism of a harvester which takes the sheaves therefrom and ejects them bodily from the binder deck while at the same time retaining their parallel relation with respect to each other.

In order to fully and clearly disclose my invention, I have illustrated one embodiment thereof in the accompanying drawings, wherein the same is shown to be adapted to use in connection with a grain shocker. It is to be understood, however, that my invention is not limited to use in this particular connection and that the construction shown herein is susceptible of modification.

Fig. 2 is an end elevation of the mechanism shown in Fig. 1, the view being taken approximately on line 2—2 looking in the direction of the arrow; and Fig. 3 is an elevation taken on line 3—3 of Fig. 1 looking in the direction of the arrow.

Figure 1:
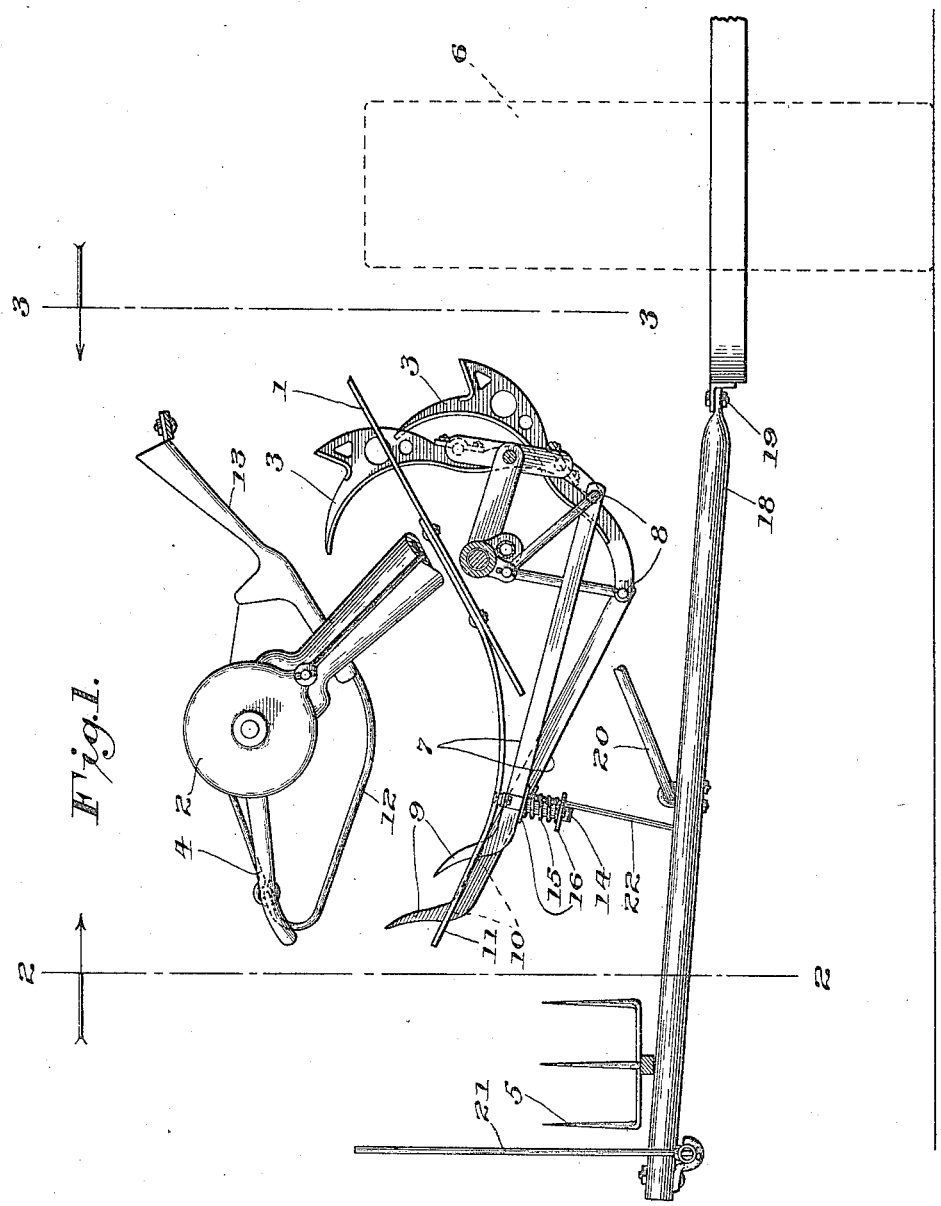
Figure 1 is a side elevation of the sheaf forming and discharging mechanism of a harvester equipped with my improvement, certain of the well-known harvester parts being omitted to facilitate clearness of illustration.

In these drawings I have illustrated a harvester having a deck 1, a knotter 2, packer arms 3, and discharge arms 4 adapted to coöperate with the latter to deliver bound sheaves to the movable shock delivering fork 5 of a shocker in a well-known manner; all of the movable sheaf-forming mechanism being operatively connected to the main wheel 6 of the harvester through well-known mechanism. Inasmuch as the construction of the harvester and shocker does not form a part of this invention, illustration of the same has been omitted from the drawing.

Coöperating with the sheaf forming mechanism of the harvester I provide means adapted to receive the bound sheaves therefrom and eject the same from the binder deck with a positive feeding action. These means are shown to comprise one or more kicker arms 7, having their inner ends pivoted at 8 to depending portions of the packer arms 3. These kicker arms are bodily movable back and forth in parallel planes and through their connection with the packer arms, are continuously movable therewith as the packer arms are actuated to pack the grain into a sheaf. Each of these kicker arms extends substantially horizontally from its pivot point beyond the outer edge of the binder deck 1, and has an upwardly extending tooth 9 which protrudes through a suitable opening or slot 10 in a supplemental binder deck 11 fixed to and forming a continuation of the deck 1. In a preferred form this supplemental deck is slightly curved upward until it lies in substantially parallel relation with respect to the resilient sheaf guides 12 carried by the knotter breastplate 13. In order to permit the passage of the sheaf each of these kicker arms 7 is resiliently supported at its outer end in a U-shaped bracket 14 fixed to the under side of the supplemental deck 11 and having a coiled spring 15 surrounding the same and held in the desired relation thereon by washers 16. In the embodiment illustrated the shocker fork is shown to be supported in its sheaf receiving position; *i. e.*, beneath and at one side of the outer edge of the supplemental deck 11, on a support 18, which has its inner end attached to the harvester frame at 19 and its outer fork-carrying end likewise supported thereby through an additional rod 20. The pivoted trip arm 21 of the shocker is likewise supported on this support 18, at one side of the fork 5, in a position to be actuated by the sheaves ejected by the kicker arms 7. In a preferred form the supplemental deck and kicker arms are likewise provided with an additional U-shaped support 22 depending from the deck 11 and resting upon the support 18, which also serves at the same time as a protecting means for the kicker arms.

The construction shown operates as follows: When a sheaf is pushed forward by the rotating discharge arms 4 it is pierced by the tooth 9 of one of the resiliently mounted kicker arms 7 and thrust forward with a positive impetus until it is engaged by the coöperating kicker arm, which again kicks it forward toward the edge of the supplemental deck, the first mentioned arm being depressed by the sheaf during its return movement. This action continues until the sheaf is ejected from the harvester and progresses at the same time that the packer arms are packing the next sheaf, so that the sheaves are ejected from the deck as rapidly as they are bound by the binding mechanism. It is to be noted that during the progress of the sheaf toward the edge of the deck it is given a series of quick positive kicks which are delivered to the same successively by each kicker arm, so that the parallel relation of the sheaf to its fellows is not disturbed and the sheaf is so ejected that when it falls upon the shocker fork it extends substantially longitudinally thereof in the best position to be delivered thereby to the shocking mechanism. It is further to be noted that the sheaf is ejected with an added impetus in an outward direction so that it first strikes the trip 21 of the shocker fork with such impact as to actuate the same positively, and is then impaled upon the tines of shocker fork 5.

While I have herein specifically described one embodiment of my invention, it is, of course, to be understood that this embodiment is used for the purposes of illustration and that my invention is not limited to the construction shown or its adaptation thereof herein illustrated otherwise than as indicated in the appended claims.

What I claim and desire to secure by Letters Patent, is:

1. In a harvester, a binder deck, a sheaf packing arm, and a sheaf ejecting member pivotally attached to said arm and resiliently supported on said deck.

2. In a harvester, sheaf packing arms, and a plurality of relatively movable resiliently supported sheaf ejecting members pivotally attached thereto.

3. In a harvester, sheaf packing arms, and means including a plurality of ejecting members each operable thereby to impart a series of forward impulses to the sheaf.

4. In a harvester, sheaf packing arms, and means operable thereby to impart a series of forward impulses to the sheaf at different points along its length.

5. In a harvester, sheaf forming and discharging mechanism, and auxiliary mechanism including a plurality of successively acting sheaf ejecting members for ejecting the sheaf and preventing angular movement thereof during the ejecting operation operatively connected with the moving parts of said sheaf forming mechanism.

6. In a harvester, sheaf forming and discharging mechanism, sheaf ejecting mechanism including a plurality of successively acting sheaf ejecting arms operatively connected to said sheaf forming mechanism to eject a sheaf delivered to it by said discharging mechanism without angular movement of said sheaf.

7. In a harvester, sheaf packing and discharging mechanism, and supplemental means movable in parallel planes operatively connected to said packing mechanism and coöperating with the discharging mechanism to eject a sheaf from the harvester.

8. In a harvester, sheaf packing and discharging mechanism, and supplemental means movable in parallel planes operatively connected to the packing mechanism thereof for ejecting a sheaf delivered thereto by the sheaf discharging mechanism.

9. In a harvester, a binder deck, sheaf packing and discharging mechanism, and a plurality of successively acting supplemental members operatively connected to said packing mechanism and coöperating with the discharging mechanism to eject a sheaf from said binder deck in parallel relation thereto.

10. In a harvester, a binder deck, sheaf packing and discharging mechanism, a supplemental deck forming an extension of said binder deck, and supplemental means including a plurality of oppositely moving ejectors operatively connected to said sheaf packing mechanism and coöperating with said sheaf discharging mechanism to eject a sheaf from said supplemental deck with a positive outward impetus.

11. In a harvester, a binder deck, sheaf packing and discharging mechanism, a supplemental deck forming an extension of said binder deck, and supplemental means resiliently supported on said supplemental deck and operatively connected to said sheaf packing mechanism coöperating with said sheaf discharging mechanism to eject a sheaf from said supplemental deck with a plurality of short quick impulses.

12. In a harvester, a binder deck, sheaf forming and discharging mechanism adjacent thereto, a supplemental deck protruding beyond the end of said binder deck, and a plurality of continuously operating ejecting members operatively connected with one of the moving parts of said sheaf forming mechanism ejecting from said supplemental deck a sheaf delivered thereto by said sheaf discharging mechanism.

13. In a harvester, a binder deck, sheaf packing and discharging mechanism mounted adjacent thereto, a supplemental deck forming an extension of said binder deck, and a plurality of longitudinally movable successively acting kicker forks pivoted to said packing mechanism and movable thereby to eject from said supplemental deck a sheaf delivered thereto by said discharging mechanism while the next succeeding sheaf is being formed.

14. In a harvester, a binder deck, a sheaf packing and discharging mechanism, a supplemental deck forming an extension of said binder deck, and supplemental means operatively connected to said sheaf packing mechanism and coöperating with said sheaf discharging mechanism to eject a sheaf from said supplemental deck with a plurality of short, quick impulses at different points along the length of the sheaf.

15. In a harvester, a binder deck, sheaf packing and discharging mechanism mounted adjacent thereto, a supplemental deck forming an extension of said binder deck, and a plurality of longitudinally movable kicker forks resiliently supported by said binder deck and operatively connected to said packing mechanism movable by the latter to eject from said supplemental deck a sheaf delivered thereto by said discharging mechanism while the next succeeding sheaf is being formed.

16. In a harvester, a binder deck, sheaf forming and discharging mechanism delivering a sheaf thereon, and supplemental discharging mechanism including successively acting sheaf ejecting members operatively connected to said mechanism and receiving a sheaf discharged thereby the path of movement of the outer ends of said ejecting members extending beyond the outer edge of said binder deck whereby the sheaf ejecting members feed the sheaves outward into a position beyond the end of the binder deck without angular movement thereof.

In testimony whereof I affix my signature, in the presence of two witnesses.

CLEMMA R. RANEY.

Witnesses:
  RAY PATTISON,
  FRANK A. ZABILKA.

Copies of this patent may be obtained for five cents each, by addressing the "Commissioner of Patents, Washington, D. C."